(12) United States Patent
Mathews (10) Patent No.: US 7,266,390 B2
(45) Date of Patent: Sep. 4, 2007

(54) NETWORK INTERFACE CASSETTE ADAPTER AND METHOD

(75) Inventor: David K. Mathews, Fort Worth, TX (US)

(73) Assignee: RadioShack Corporation, Fort Worth, TX (US)

( * ) Notice: Subject to any disclaimer, the term of this patent is extended or adjusted under 35 U.S.C. 154(b) by 87 days.

(21) Appl. No.: 10/858,538

(22) Filed: Jun. 1, 2004

(65) Prior Publication Data

US 2005/0266800 A1    Dec. 1, 2005

(51) Int. Cl.
*H04M 11/00*    (2006.01)

(52) U.S. Cl. ............................ 455/556.1; 455/569.1; 369/2

(58) Field of Classification Search ............ 455/569.1, 455/557, 425, 556.1; 369/2, 11
See application file for complete search history.

(56) References Cited

U.S. PATENT DOCUMENTS

| | | | |
|---|---|---|---|
| 3,619,515 A | | 11/1971 | Lace |
| 4,034,164 A | | 7/1977 | Westmoland |
| 4,734,897 A | | 3/1988 | Schotz |
| 5,307,326 A | * | 4/1994 | Osawa ........................... 369/2 |
| 5,654,942 A | * | 8/1997 | Akahane ........................ 369/2 |
| 5,794,138 A | | 8/1998 | Briskman |
| 6,058,319 A | | 5/2000 | Sadler |
| 6,091,672 A | * | 7/2000 | Oh ................................ 369/2 |
| 6,301,513 B1 | * | 10/2001 | Divon et al. .................. 700/94 |
| 6,941,180 B1 | * | 9/2005 | Fischer et al. ................ 700/94 |
| 2002/0177476 A1 | * | 11/2002 | Chou ........................... 455/574 |
| 2003/0036407 A1 | * | 2/2003 | Kapoor et al. .............. 455/557 |
| 2003/0224726 A1 | * | 12/2003 | Shearer et al. ............. 455/41.1 |
| 2005/0026559 A1 | * | 2/2005 | Khedouri ................... 455/3.06 |
| 2005/0107120 A1 | * | 5/2005 | Yueh ........................... 455/557 |
| 2005/0245191 A1 | * | 11/2005 | Falcon ....................... 455/3.06 |
| 2006/0141925 A1 | * | 6/2006 | Chagger .................... 455/3.06 |

* cited by examiner

*Primary Examiner*—Edward F. Urban
*Assistant Examiner*—Blane J. Jackson
(74) *Attorney, Agent, or Firm*—Dan Brown Law Office; Daniel R. Brown (57) ABSTRACT

A network interface cassette for coupling signals between a wireless network and a tape head in a cassette tape player. The network interface cassette includes an enclosure that is conformed to the cassette tape form factor. It contains a transceiver that converts base band signals for radio frequency communications within the wireless network. It also contains a network controller that is coupled to communicate the base band signals with the transceiver. The network controller converts digital audio signals to and from the base band signals. There is an audio processor that converts the digital audio signals to analog audio signals. A coupling means converts the analog audio signals to magnetic audio signals. The coupling means is aligned to couple the magnetic audio signals to the tape head. A power supply with batteries and a generator driven from the cassette player capstan are provided. A wireless user interface adapter is provided to couple microphone and audio signals to the apparatus. Plural communications requests are processed, and include a priority scheme to manage resource contention.

26 Claims, 5 Drawing Sheets

NETWORK INTERFACE CASSETTE ADAPTER AND METHOD

BACKGROUND OF THE INVENTION

1. Field of the Invention

The present invention relates electronic audio transmission and reproduction. More specifically, the present invention relates to an apparatus and method for coupling audio content through a wireless network and to a cassette tape player for acoustic reproduction.

2. Description of the Related Art

In the past, users obtained audio content either from receipt of commercial broadcast services or by purchasing prerecorded media. Music and spoken audio content have been continually transmitted by commercial AM and FM broadcast radio stations for many years. Vinyl records were once the dominant form of prerecorded media. Later, 8-track cartridges, cassette tapes, and compact discs became popular forms of distribution for prerecorded audio content media. Mobility during receipt and playback of audio content has always been an important and desirable feature. For example, automotive AM/FM-cassette and CD players have become a standard accessory in modern cars and trucks. Portable radio and cassette players are in common use today as well. In fact, there is a huge installed base of radio receivers and prerecorded media players, such as cassette tape players, in the market today. Virtually all consumers of prerecorded audio content possess some form of high fidelity stereo system.

Recently developed technologies are changing the way that users receive and playback audio content. These technologies include the ubiquitous deployment of personal computing devices, Internet networking, and local area wireless data networks. Today, users are able to download digital audio files from service providers over the Internet and store them in a personal computing device. Systems consisting of a personal computing device and a connected amplifier with loud speakers can then reproduce the digital audio files directly or through interconnection to a conventional high fidelity stereo system. Wire or fiber optic cables have typically interconnected the components of such systems. Portable devices are also available, which can receive compressed audio content data files and reproduce them at a later time. An example of such a device is a portable MP3 audio player, which typically reproduces audio files through a pair of headphones or earphones.

Modern technologies have also enabled other sources for audio content. Such devices include direct broadcast satellite radio receivers, wireless and cellular telephones, GPS receivers, weather radios, digital cameras, video cameras, digital audio recorders, and even personal computing devices, such as personal digital assistants ("PDA") and laptop or palm-top computers. All of these devices have relied upon cables for interconnection and transfer of audio content. However, wireless technologies are now available that enable interconnection of various audio content devices without the use of physical wires and cables.

Wireless interconnectivity is available in a number of configurations. Simple point-to-point systems have been available for some time. Recently, standardized systems and protocols have been developed that enable multiple devices to wirelessly communicate within a local area network ("LAN"). An example of this is the Bluetooth protocol that forms wireless "piconets" designed specifically to replace the interconnecting wires and cables among several portable devices. Audio and data signals can be transmitted within such wireless LAN's. Another wireless connectively solution is the wireless Ethernet standard promulgated by the IEEE as the IEEE 802.11 et. seq. standard, known to those skilled in the art. This standard defines a wireless extension of the Internet using the TCP/IP protocol standard in a 2.4 GHz (ISM band), 5.8 GHz band and other wireless Ethernet environments. The implementation of such a system is colloquially known as an Internet Wi-Fi Hotspot. The IEEE has promulgated other wireless TCP/IP network solutions. Other wireless connectivity standards are known and even more will certainly be developed as the demand for wireless connectivity continues to grow.

With respect to the acoustic reproduction of audio content, each of the aforementioned devices, whether connected by cable or wirelessly, requires an electro-mechanical transducer to create sound. Headphones and earphones are frequently used, but many users prefer audio reproduction through loudspeakers. When there is a plurality of audio content sources, the implementation of a plurality of amplifier and loudspeaker systems quickly becomes impractical. In fact, even a single dedicated amplified loudspeaker for one of these devices is cumulative to existing amplifier and loudspeaker systems that most users already possess, such as the aforementioned portable stereo, the automotive stereo, and the home high-fidelity stereo system. Thus, there is a need in the art for a system method for connecting wirelessly coupled audio content delivery terminal devices to existing high-fidelity stereo systems.

SUMMARY OF THE INVENTION

The need in the art is addressed by the apparatus and methods of the present invention. A network interface cassette for coupling signals between a wireless network and a tape head in a cassette tape player is taught. The network interface cassette includes an enclosure that is conformed to the cassette tape form factor. It contains a transceiver that converts base band signals for radio frequency communications within the wireless network. It also contains a network controller that is coupled to communicate the base band signals with the transceiver. The network controller converts digital audio signals to and from the base band signals. There is an audio processor that converts the digital audio signals to analog audio signals. A coupling means converts the analog audio signals to magnetic audio signals. The coupling means is aligned to couple the magnetic audio signals to the tape head.

In a specific embodiment of the invention, the network interface cassette also includes a power supply disposed within the enclosure that provides electric power to the transceiver, the network controller, and the audio processor. In a refinement, the power supply further includes a switch positioned for actuation when the enclosure is inserted into the tape player. Upon actuation, the switch couples the electrical power. In one embodiment, the cassette player includes a rotating capstan and a pinch roller, and the power supply further includes a generator for producing the electric power. The generator is rotatably coupled to the capstan shaft so that it derives mechanical power therefrom. The generator may be rotatably coupled to the capstan by a tape engaged between the capstan and the pinch roller. The generator may be rotatably coupled to the capstan by a means for multiplying rotational speed.

In another specific embodiment, the network interface cassette is adapted to provide an ear and mouth signal interface for a wireless network enabled cellular telephone. In this embodiment, a microphone input is coupled to the audio processor, and is used for inputting microphone signals. The audio processor converts the microphone signals to digital microphone signals. The network controller converts the digital microphone signals to base band wireless network signals for coupling to, and transmission from, the transceiver and into the wireless network. This arrangement enables ear and mouth signal communications with the cellular telephone through utilization of the microphone input and the cassette tape player audio playback capabilities. In another embodiment, the network interface cassette also includes a microphone coupled to the microphone input.

In a refinement to the invention, the network interface cassette further includes an auxiliary audio input coupled to the audio processor, which is for receiving auxiliary audio signals. The audio processor couples the auxiliary audio signals to the coupling means. In another embodiment, the network interface cassette further includes an audio output that receives the analog audio signals from the audio processor. This arrangement enables the connection of an external device.

In another specific embodiment of the present invention, the network interface cassette includes an additional module for enabling a wireless user interface connection. The module includes a module transceiver, which converts base band signals for radio frequency communications within the wireless network, and a module network controller, which communicates the base band signals with the module transceiver. The module transceiver converts digital audio signals to and from the base band signals. The module also includes a module audio processor that converts the digital audio signals to analog audio signals, and a module interface that couples analog audio signals with the module audio processor. In operation, the module network controller establishes audio connections with the cassette network controller through the module transceiver and the cassette transceiver, which occurs according to a wireless network protocol.

In a refinement to the prior embodiment, the module interface includes a module microphone input that receives analog microphone signals. It may also include a module microphone coupled to the module microphone input. In another refinement to the invention, the module interface has a module audio output that receives the analog audio signals from the audio processor, thereby enabling the connection of an external device. In another embodiment of the module, it includes a module power supply that provides electric power to the module transceiver, the module network controller, and the module audio processor. In an improved version of the module, it includes a photovoltaic cell coupled to the module power supply.

The present invention also teaches a method of reproducing audio signals between a wireless network and a tape head in a cassette tape player. The method includes the steps of converting base band signals for radio frequency communications within the wireless network, then converting digital audio signals to and from the base band signals. The method further includes the steps of converting the digital audio signals to analog audio signals, and converting the analog audio signals to magnetic audio signals. Finally, the step of coupling the magnetic audio signals to the tape head by inserting an enclosure conformed to the cassette tape form factor into the cassette tape player, thereby enabling the reproduction of audio signals by the cassette tape player.

In a specific embodiment of the method, the converting steps are accomplished by semiconductor devices, which are powered by a power supply disposed within the enclosure. An improvement to the method includes the steps of actuating a switch upon inserting the enclosure into the cassette tape player, thereby coupling the power supply to the semiconductor devices. In another embodiment, the cassette player includes a rotating capstan and a pinch roller, and the method includes the further steps of coupling mechanical power from the capstan to the generator, and generating electric power with that mechanical power. The step of rotatably coupling to the capstan with a tape engaged between the capstan and the pinch roller may be added. An improvement adds the step of multiplying the rotational speed of the capstan to increase the generator speed.

A specific embodiment of the foregoing method is adapted to provide ear and mouth telephone signals for a wireless network enabled cellular telephone. This embodiment includes the steps of inputting analog microphone signals and converting them to digital microphone signals. Then, converting the digital microphone signals to base band wireless network signals for coupling to, and transmission from, the wireless network. In an improvement, the step of coupling auxiliary audio signals from an auxiliary audio input, prior to the converting the analog audio signals to magnetic audio signals step, is added. Another improvement further includes the step of establishing a first streaming audio connection from an external wireless network device to the tape head, thereby enabling acoustic audio reproduction through the cassette tape player. In a refinement of the improvement, the step of establishing a second streaming audio connection from a microphone to the external wireless network device is added.

In another specific embodiment of the method, priority control is added. This includes the steps of establishing a first streaming audio connection, having a first priority assigned thereto, from an external wireless network device to the tape head. Then, receiving a request for a second streaming audio connection, having a second priority assigned thereto, and preempting the first streaming audio connection if the second priority is higher than the first priority. In a further improvement to the priority control method, the steps of establishing a second streaming audio connection according to the request, and reverting to the first streaming audio connection when the second streaming audio connection is terminated are added.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

The wireless network interface cassette adapter and method of the present invention bridges the gap between wireless audio content delivery terminal devices of varying types and existing high fidelity audio playback systems. The existence of wireless local area network connectivity and standardized magnetic tape playback systems are advantageously leveraged to provide users with a low cost, convenient, and flexible audio reproduction system. The teachings of the present invention are applicable to any wireless local area network standard, whether presently defined and deployed, or those that may be later developed. In specific embodiments, the Bluetooth piconet personal area network ("PAN") and Wi-Fi wireless local area network ("WLAN"), as defined by IEEE standard 802.11 et. seq. and its progeny, are contemplated. However, those skilled in the art will readily appreciate that the teachings of the present invention are applicable and useful for any digital wireless system capable of wirelessly coupling audio content. This is true whether the content comprises discrete audio files, compressed audio files, streaming, pseudo real-time, delivery systems, or voice data in the form of text-to-speech.

Figure 1:
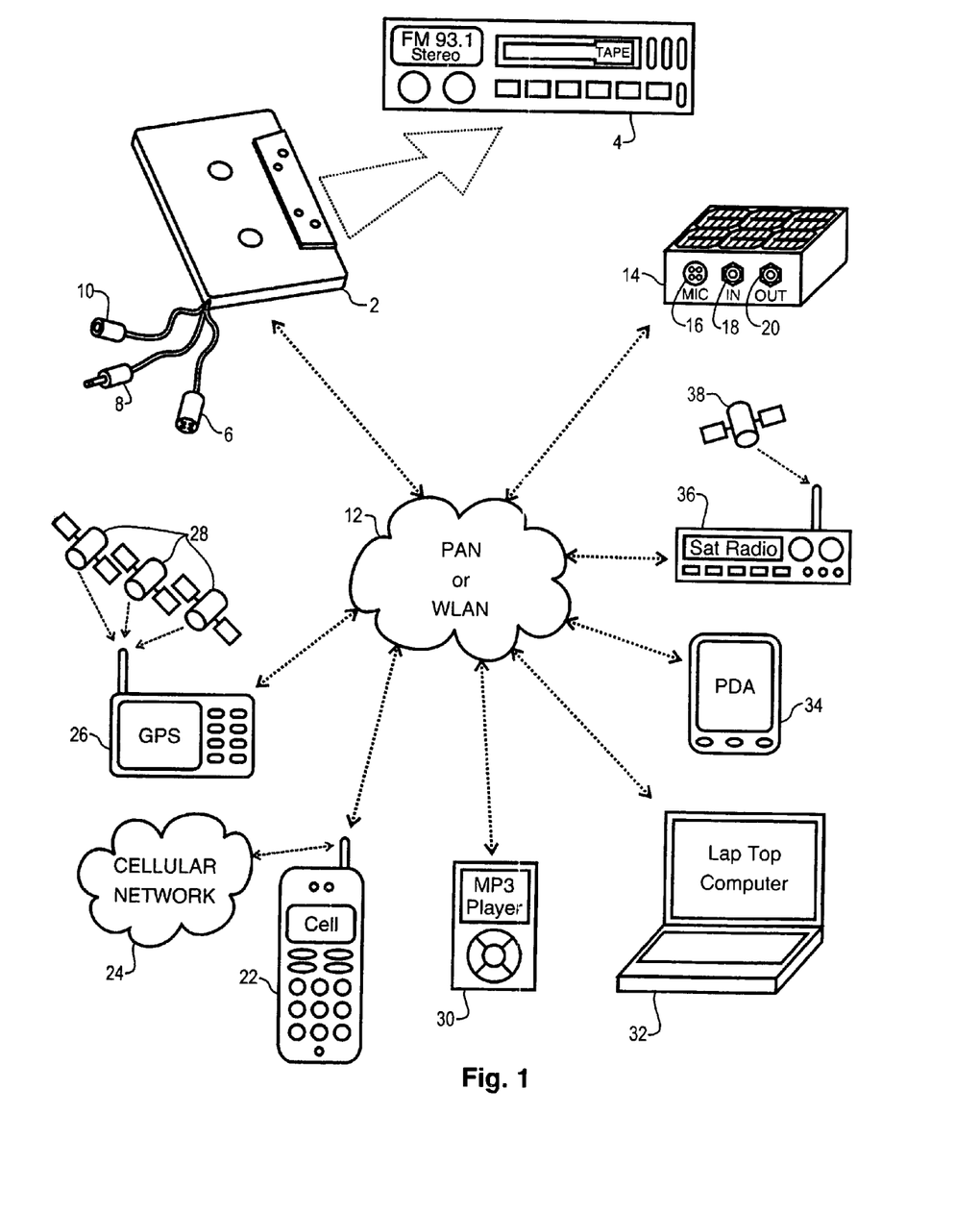
FIG. 1 is a system diagram of an illustrative embodiment of the present invention.

Reference is directed to FIG. 1, which is a system diagram of an illustrative embodiment of the present invention. Bluetooth personal area networks ("PAN") 12 or WiFi wireless local area networks ("WLAN") 12 exists by virtue of the presence of two or more compliant devices, as is understood by those skilled in the art. Collectively, these will be referred to as wireless locals area networks ("WLAN") herein. A variety of compliant terminal devices are also known. If FIG. 1, there is illustrated a direct broadcast satellite ("DBS") radio receiver 36, which is compliant with the WLAN 12. DBS receivers obtain audio content from one or more orbiting satellites 38. In the case of a WLAN compliant DBS receiver 36, the device 36 includes controller and transceiver hardware and software that enable the receiver 36 to couple digital audio content within the WLAN 12. In a similar vein, personal digital assistants ("PDA") 34 are known that are WLAN compliant, and are able to send and receive digital audio content within the WLAN 12. Of course, laptop and palm-top personal computing devices 32 are also known to be WLAN 12 compliant. Modern digital audio file players, such as MP3 compliant players 30 are known to be WLAN 12 enabled as well. Another WLAN compliant device is a global positional system ("GPS") receiver 26, which receives time and location information from a constellation of low-earth orbiting satellites 28. Such receivers are known to output audio content, and can do so within a WLAN 12.

Current cellular and wireless telephones (collectively "cellular telephones"), including third generation technology ("G3") cellular telephones 22 that are known to be WLAN complaint. In addition to communicating over a cellular telephone networks 24, such cellular telephones 22 include a controller and transceiver that enable communications within the WLAN 12. The transfer of audio content is duplex in such cellular telephones so that both ear and mouth signals can be simultaneously transferred. With such operation, the microphone and earphone interface for the cellular telephone can be provided over the WLAN 12. For example, a wireless headset could be provided for the cellular telephone 22, which couples the ear and mouth signals through the WLAN 12.

FIG. 1 illustrates the variety of audio content terminal devices that are WLAN enabled, and that can send and receive audio content through a WLAN. The apparatus in an illustrative embodiment of the present invention is the network interface cassette adapter ("NIC") 2. The NIC 2 conforms to the physical size and dimensions of a cassette tape cartridge for the intended cassette tape player 4, and therefore, can be inserted into the cassette tape player 4. Stated at a systems functionality level, the NIC 2 couples radio frequency signals with the WLAN 12, which include both WLAN protocol signals and encoded audio content, and converts a portion of these signals to magnetic audio signals corresponding to the audio content, a portion of which are coupled to a magnetic tape head (not shown) within the cassette tape player 4. The audio content can then be amplified and reproduced by the existing circuitry and components (not shown) of the cassette tape player 4. The user can therefore reproduce WLAN 12 audio content from any of the aforementioned WLAN compliant devices through the cassette tape player 4.

In a particular embodiment, the NIC 2 includes an external microphone 6, which is connected via a cable to the NIC enclosure 2. In operation, this microphone 6 cable passes outside of the cassette player 4 tape opening. A typical use of the wired microphone 6 is to provide the mouth interface in a cellular telephone hands-free mode of operation. The loudspeakers (not shown) of the cassette tape player 4 provides the ear interface. The NIC 2 converts the analog ear and mouth signals into the radio frequency domain and radiates these signals into the WLAN 12. The cellular telephone 22 couples these signals from the WLAN 12 and then converts them into the radio frequency domain of the cellular network 24. Hands free cellular telephone operation is known to those skilled in the art. The advantage of the illustrative embodiment is that the loudspeakers of the cassette tape player 4 are utilized instead of requiring a separate amplifier and loudspeaker to accomplish the desired task. This is particularly well suited to the vehicular environment. The microphone 6 can be clipped to the dashboard of the vehicle, in a position suitable to intercept the spoken voice of the occupants, and the vehicle stereo high-fidelity speakers are used to reproduce the audio received in a telephone conversation.

The NIC 2 in illustrative embodiment of FIG. 1 also includes an output connector 8, which may be an industry standard ⅛" stereo plug. This connector 8 outputs the same audio content that is coupled to the magnetic tape head in the cassette tape player 4. This is useful if the user desires to record the audio content into a separate recording device that is not in and of itself WLAN compliant. In this embodiment, the output connector 8 is cabled to the NIC 2 enclosure, and passes through the cassette tape opening in the cassette tape player 4. The illustrative embodiment also includes an auxiliary input jack 10, which is also cabled to the NIC enclosure 2. The jack may be an industry standard ⅛" stereo jack. This input 10 allows the user to couple an external audio source to the system. For example, the user can connect the headphone output of a CD player, so that the CD audio content can be coupled through to the cassette tape player 4 tape head. The auxiliary input is particularly useful for connecting audio content that are not otherwise WLAN enabled.

There are situations where a wired interface connector is not desirable. For example, some cassette tape player cassette door openings do not lend themselves to having wires and cables passed through during operation. A specific embodiment of the present invention addresses this issue, among others, by providing a wireless user interface adaptor ("WIA") 14. The WIA offers the same microphone 16, auxiliary input 18, and auxiliary output 20 as discussed above, but without the need to have wires or cables pass through the cassette tape player 4 opening. This accomplished be making the WIA an WLAN compliant device in and of itself. In operation, duplex audio paths are set up through the WLAN 12 between the NIC 2 and the WIA 14. The interface signals can therefore be communicated wirelessly. The WIA will be more fully discussed hereinafter.

Figure 2:
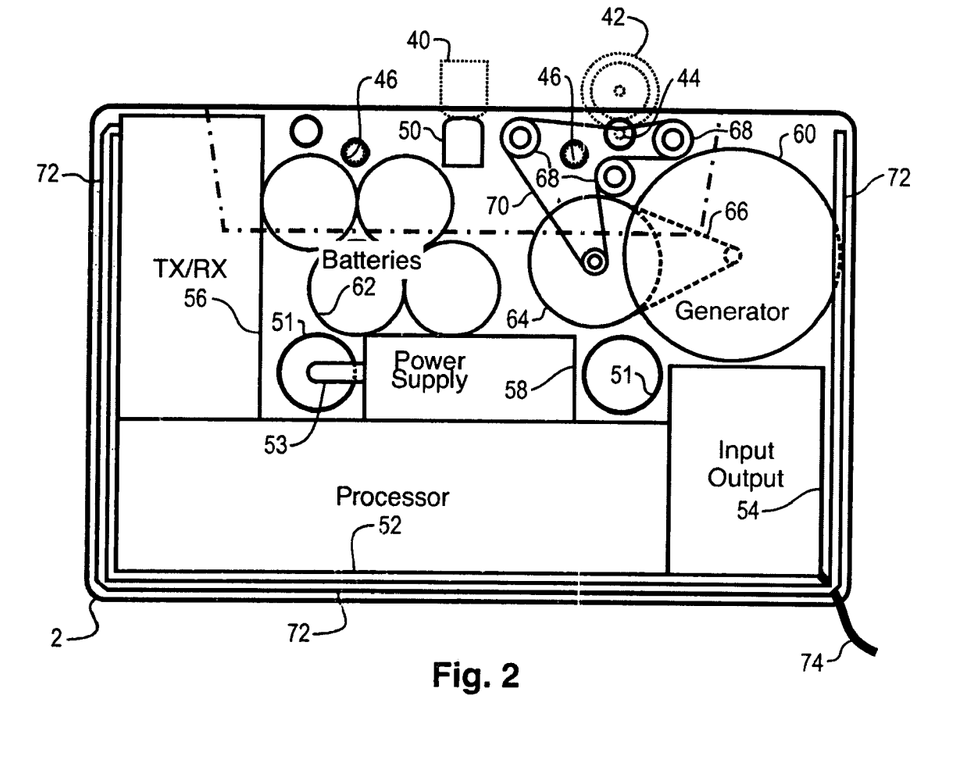
FIG. 2 is a diagram of a network interface cassette adapter according to an illustrative embodiment of the present invention.

Reference is now directed to FIG. 2, which is a diagram of the network interface cassette adapter ("NIC") 2 according to an illustrative embodiment of the present invention. A NIC enclosure 2 is designed to conform to the cassette tape form factor. In the illustrative embodiment, the common stereo cassette tape, as currently used in the majority of consumer tape players, is conformed to. However, the scope of the present invention extends to magnetic tape cartridges and cassettes of all types. FIG. 2 illustrates the relative position of the magnetic tape head 40 of the cassette tape player (not shown). Also, the capstan shaft 44 and pinch roller 42 of the cassette tape player are shown in the playback positions. The cassette tape player alignment pins 46 are also illustrated. Those skilled in the art are familiar with the cassette tape form factor, and the playback operation of such machines. When the NIC enclosure 2 is inserted into a cassette tape player, a magnetic transducer 50 is held in alignment with the tape head 40 of the cassette player. The magnetic transducer is a stereo device, comprising two coils that convert analog audio signals to magnetic signals. The magnetic field created by the transducer 50 couples to the playback head 40 in the cassette tape player. The audio signals are coupled from the transducer 50 to the tape head 40. Such transducers 50 are known to those skilled in the art.

The magnetic transducer 50 is coupled to an audio input and output circuit 54, which comprises audio signal conditioning and amplification functions useful to match signal levels and impedances amongst the various system components. Such circuitry is known to those skilled in the art. The microphone, auxiliary input, and auxiliary output discussed above are coupled to input and output circuit 54 by cable 74. The input and output circuit 54 is an analog circuit. Analog audio signals are coupled to processor circuitry 52. The processor circuitry 52 provides several functions in the NIC apparatus. These include analog to digital, and digital to analog conversion of the analog audio signals, and, includes general control of the NIC functions. The processor circuitry 52 also provides the WLAN network protocol and signaling control, which will be more fully discussed hereinafter. Ultimately, the processor circuitry 52 provides duplex base band network signals to and from the transceiver 56. The transceiver 56 modulates and demodulates the base band network signals to and from an RF carrier signal. The RF signals art coupled to antenna 72, which electromagnetically couples to the WLAN, as is understood by those skilled in the art. The antenna 72 is routed about the periphery of the enclosure 2, so as to provide good RF coupling, regardless of the type of cassette tape player that the NIC 2 is inserted into.

The various circuits within the NIC 2, in FIG. 1, is electrically powered by a power supply circuit 58, which provides the required voltage and current to operate the NIC 2. A switch actuator 53 is coupled to a switch (not shown) within the NIC 2 enclosure. The actuator 53 is positioned for actuation when the NIC enclosure 2 is inserted into a cassette tape player. Actuation of the switch couples electrical power from the power supply to the circuitry of the NIC 2. In the illustrative embodiment, the actuator engages a reel spindle of the cassette tape player through one of the spindle holes 51 of the enclosure 2, however, any suitable actuator and engagement technique could be employed. A set of batteries 62, which are rechargeable batteries in the illustrative embodiment, are disposed within the NIC enclosure 2. The batteries 62 are coupled to the power supply 58 and provide the power reserve to operate the NIC 2. Replaceable batteries could also be utilized in another embodiment, in which the user replaces the batteries from time to time. However, in the illustrative embodiment, the motive force of the tape player's capstan shaft 44 is advantageously utilized.

In the illustrative embodiment, a compact electric generator 60 is disposed within the NIC enclosure 2. The generator is mechanically coupled to receive rotational force from the capstan shaft 44 of the cassette tape player. Since the cassette tape player is designed to drive a magnetic tape in normal operation, the illustrative embodiment utilizes a small tape loop 70 to couple power. The tape loop 70 is guided between the capstan shaft 44 and the pinch roller 42 by a set of spindle pulleys 68. When the NIC enclosure is inserted into the cassette tape player, the mechanism of the tape player urges the pinch roller 42 against the capstan shaft 44, which thus engages the tape loop 70. The rotation of the capstan shaft 44 moves the tape 70, which is coupled to a driven pulley 64. The diameters of the driven pulley 64 in conjunction with the coupling belt 66 to the generator 60 input pulley effectively multiply the rotational speed of the capstan shaft to an angular velocity suitable for driving the generator 60. Those skilled in the art will appreciate that other means exist for multiplying rotational velocity, such as friction wheels, belts and pulleys, gear trains, and so forth. The electric current generated by the generator 60 is coupled to the power supply. The generated electrical power is used to power the NIC 2 circuitry directly, recharge the storage batteries 62, or both. With the availability of generator power, the NIC 2 is capable of operating for extended periods of time, without attention from the user. In fact, once inserted into the cassette tape player, the NIC 2 can be virtually ignored, effectively turning the conventional cassette tape player into a WLAN enabled device. Installation of the NIC is trivial, even for the unsophisticated user.

Figure 3:
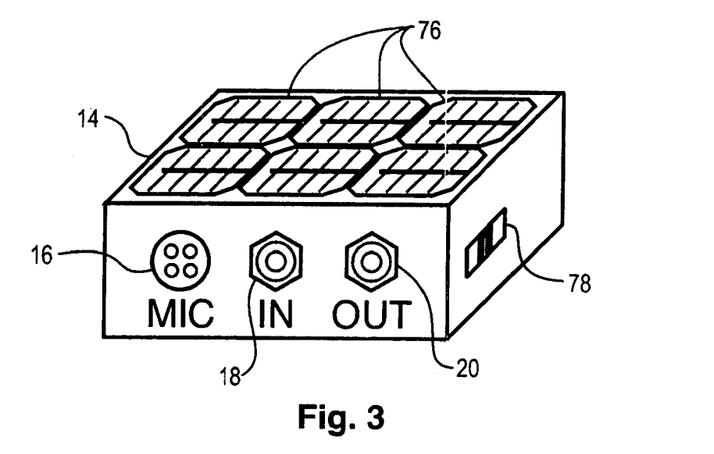
FIG. 3 is a diagram of a wireless user interface adapter according to an illustrative embodiment of the present invention.

Reference is directed to FIG. 3, which is a diagram of a wireless user interface adapter ("WIA") 14 according to an illustrative embodiment of the present invention. The WIA 14 is useful in applications where it is undesirable to route cables to and from the NIC enclosure. The WIA 14 is a stand-alone WLAN enabled input and output device, and thus includes its own processors and transceiver for radio frequency communications through the WLAN. In operation, the WIA 14 may be placed on the dashboard of the user's vehicle, which locates its microphone 16 relatively close to the user, facilitating operation as a hands free speakerphone. As discussed above, an auxiliary input jack 18 and auxiliary output jack 20 are present on the exterior of the WIA enclosure 14. A power switch 78 is presented on the exterior of the enclosure 14. In one embodiment, the WIA 14 includes an array of photovoltaic cells 76 on its top surface. When placed in a sunny location, such as a vehicle dashboard, the photovoltaic cells 76 provide electric current to operate the WIA 14 and or recharge its internal batteries (not shown).

Figure 4:
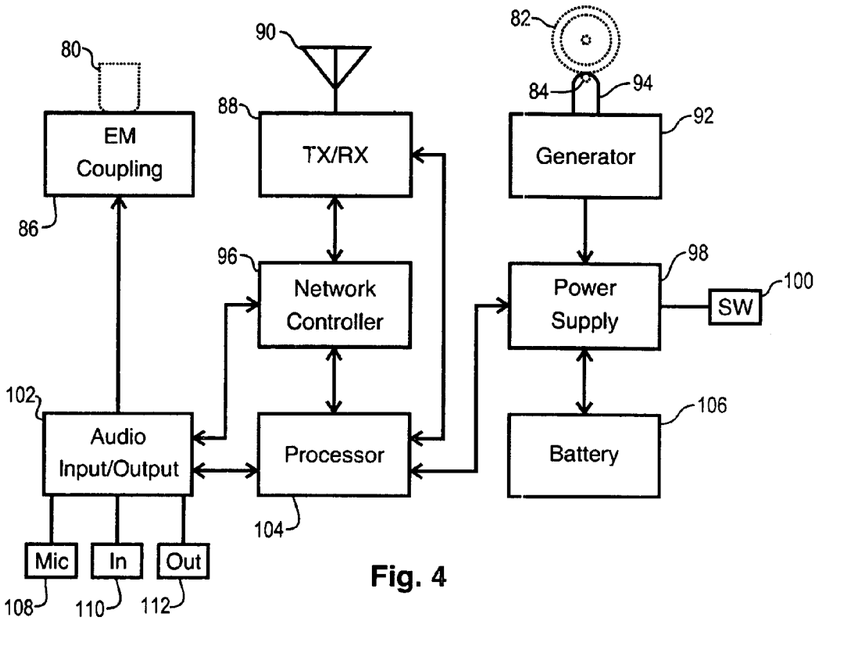
FIG. 4 is a functional block diagram of a network interface cassette adapter according to an illustrative embodiment of the present invention.

Reference is directed to FIG. 4, which is a functional block diagram of a network interface cassette adapter ("NIC") according to an illustrative embodiment of the present invention. The NIC interfaces to a cassette tape player via the player's tape head 80 and the capstan shaft 84 and pinch roller 82. At the WLAN end of the device, the interface is accomplished through an antenna 90, which couples electromagnetic energy with the WLAN. The radio frequency signaling necessarily follows the protocol of the coupled WLAN. These signals include audio data and WLAN protocol data. A radio frequency transceiver 88 is coupled to the antenna 90. The transceiver modulates and demodulates base band WLAN signals. In the illustrative embodiment both duplex and simplex communications paths are supported, thus, the transceiver 88 is either a duplex device or is multiplexed in time or code space. A network controller 96 is coupled to the transceiver 88. The network controller couples digital audio signals from within the NIC and organizes them into and out of base band WLAN signals. Essentially, the network controller provides the protocol layering required for the given WLAN protocol. A digital signal processor is utilized in the illustrative embodiment, however any suitable computer device known to those skilled in the art could be employed for the network controller function.

The network controller 96 is coupled to a processor 104 and audio input and output circuit 102. Together, these circuits provide the audio processor functions of the device, as well as the general microcontroller functions employed in typical dedicated control devices. The audio processor function encodes and decodes analog audio signals to and from digital audio signals, as well as managing audio path connections and signal levels. The processor 104 may be any suitable computing device know to those skilled in the art, and may even be the same physical device as the network controller 96. The distinction between network control and audio processing is primarily functional. The audio processor couples analog audio signals and converts them into the digital domain, while the network controller manages WLAN protocol and overhead functions. The audio input and output circuit 102 portion of the audio controller includes the microphone 108, the auxiliary input 110, and auxiliary output connectors, in embodiments where these items are wired to the NIC. The audio input and output circuit also couples analog audio signals to the electromagnetic coupling means 86, which converts these signals to magnetic signals for coupling with the tape head 80. All of the audio circuits can be either stereophonic or monaural, simplex or duplex as required for each application.

The functional block diagram in FIG. 4 also illustrates the various power supply functions of the NIC. The power supply circuit 98 provides the required voltages and currents to the various components within the NIC. A power switch 100 provides the typical on and off function, by controlling coupling of electrical power to components within the NIC. A storage battery 106 is one source of raw electrical power. A generator 92 is disposed within the NIC, and is another source of raw power. The generator 92 is driven, either directly or indirectly, from a tape loop 94 that couples rotational mechanical energy from the tape player capstan 84 and pinch roller 82. The generator may either power the NIC through the power supply 98, or be used to recharge the storage batteries 106.

Figure 5:
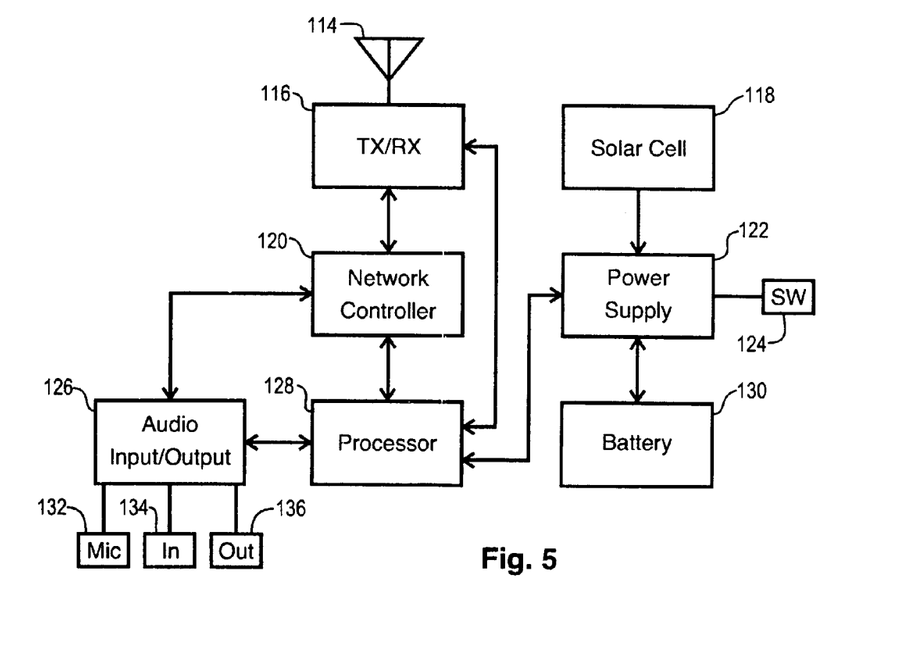
FIG. 5 is a functional block diagram of a wireless user interface adapter according to an illustrative embodiment of the present invention.

Reference is directed to FIG. 5, which is a functional block diagram of a wireless user interface adapter ("WIA") according to an illustrative embodiment of the present invention. The WIA interface to the WLAN is accomplished through an antenna 114, which couples electromagnetic energy with the WLAN. The radio frequency signaling necessarily follows the protocol of the coupled WLAN. These signals include audio data and WLAN protocol data. A radio frequency transceiver 116 is coupled to the antenna 114. The transceiver modulates and demodulates base band WLAN signals. In the illustrative embodiment both duplex and simplex communications paths are supported, thus, the transceiver 116 is either a duplex device or is multiplexed in time or code space to provide duplex communications capability. A network controller 120 is coupled to the transceiver 116. The network controller 120 couples digital audio signals from within the WIA and organizes them into and out of base band WLAN signals. Essentially, the network controller 120 provides the protocol layering required for the given WLAN protocol. A digital signal processor is utilized in the illustrative embodiment, however any suitable computer device known to those skilled in the art could be employed for the network controller function.

The network controller 120 is coupled to a processor 128 and audio input and output circuit 126. Together, these circuits provide the audio processor function of the device, as well as the general microcontroller functions employed in typical dedicated control devices. The audio processor function encodes and decodes analog audio signals to and from digital audio signals, as well as managing audio path connections, signal levels and so forth. The processor 128 may be any suitable computing device know to those skilled in the art, and may even be the same physical device as the network controller 120. The distinction between network control and audio processing is primarily functional. The audio processor couples analog audio signals and converts them into the digital domain, while the network controller 120 manages WLAN protocol and overhead functions. The audio input and output circuit 126 portion of the audio controller includes the microphone 132, the auxiliary input 134, and auxiliary output 136 connectors. All of the audio circuits can be either stereophonic or monaural, simplex or duplex as required for each application.

Power supply management in the WIA is managed by a power supply circuit 122, which includes a conventional on-off switch 124. An internal storage battery 130 is provided to power the device. While user replaceable batteries are used in one embodiment, a rechargeable battery is used in the specific embodiment. This enables to the use of photovoltaic cells 118. The photovoltaic cells can either power the WIA directly or recharge the storage batteries 130, or both. In operation the WIA of FIG. 5 serves as a wireless interface to the NIC, with communications there between accomplished through WLAN audio connection paths. This is essentially the same communications protocol used between the NIC and the various audio content terminal devices, discussed above.

Figure 6:
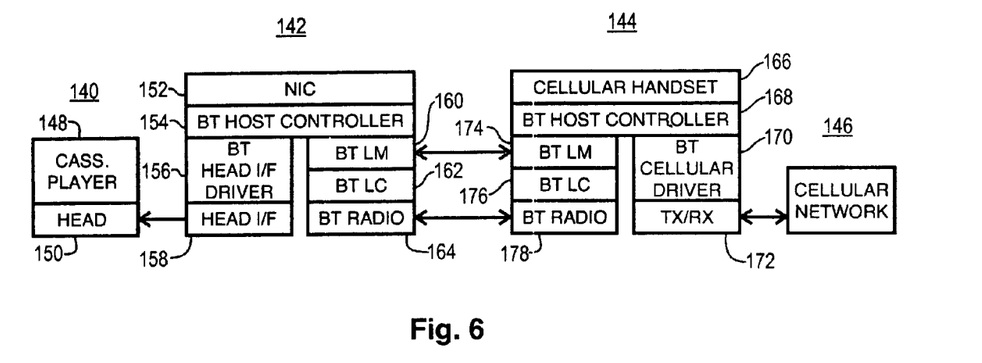
FIG. 6 is a functional diagram of a cassette tape player to a wireless network Bluetooth connection according to an illustrative embodiment of the present invention.

Reference is directed to FIG. 6, which is a functional diagram of a cassette player to a cellular network Bluetooth connection through a NIC according to an illustrative embodiment of the present invention. The illustrative embodiment WLAN is implemented as a Bluetooth personal area piconet network. The audio content transfer scenario depicted in FIG. 6 involves half of a telephone call from a third party located somewhere in a cellular network 146, which is coupled through to a cassette player 140, via a cellular telephone handset 144 and a NIC 142. The diagram in FIG. 6 is structured as a conventional ISO network architectural model, known to those skilled in the art. At the physical level, the coupling between the cellular network 146 and the cellular telephone 144 occurs as cellular radio signals between the cellular network 146 and the cellular transceiver 172. The physical link between the cellular handset 144 and the NIC 142 occurs through Bluetooth radio signals between the cellular handset Bluetooth radio 178 and the NIC Bluetooth radio 164. The physical link between the NIC 142 and the cassette tape player 140 occurs via magnetic flux coupling between the NIC head interface means 158 and the cassette tape player head 150. Above the physical layer is the hardware/software interface layers, which include the software to hardware drivers.

The NIC 142 head interface means 158 is coupled to the NIC Bluetooth host controller 154 by a Bluetooth head interface driver 156. On the Bluetooth radio link side of the NIC 142, the Bluetooth link controller 162 and Bluetooth link manager 160 couple to the Bluetooth host controller. This structure is well known to those skilled in the art. The Bluetooth radio 164 in the NIC 142 communicates with the Bluetooth radio 178 in the cellular handset 144. At the link level, the corresponding link mangers 160 and 174 control the Bluetooth session. The cellular handset Bluetooth link controller 176 provides the physical to software interface on the cellular handset 144 side. The Bluetooth host controller 168 in the cellular handset 166 couples to the Bluetooth cellular radio driver, which physically couples to the cellular transceiver 172. Thus, the audio content is transferred across both the cellular network and the Bluetooth network forming an end-to-end link. The diagram in FIG. 6 is illustrative of a typical audio content link established for one session through the network. Other links, such as the coupling of microphone audio from the NIC to the wireless network, would be accomplished with a similar network session model.

Figure 7:
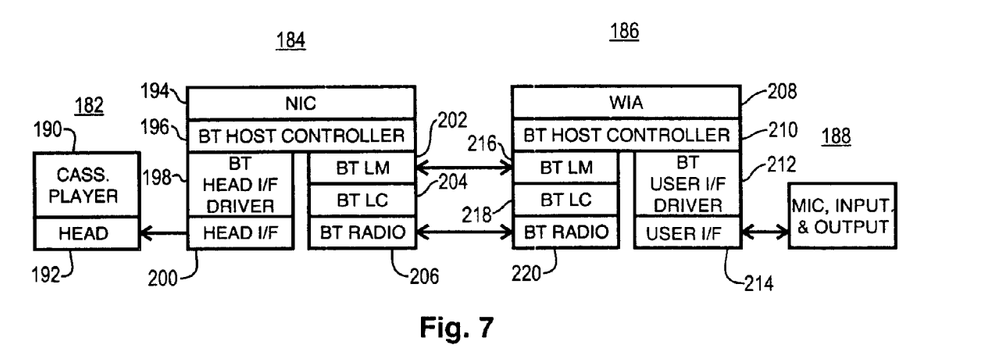
FIG. 7 is a functional diagram of a cassette tape player to a wireless user interface Bluetooth connection according to an illustrative embodiment of the present invention.

Reference is directed to FIG. 7, which is a functional diagram of a cassette player 182 to a wireless user interface adapter ("WIA") 186 Bluetooth connection according to an illustrative embodiment of the present invention. This diagram uses the ISO network model to illustrate an audio content connection from an auxiliary input to the WIA 188, played through the cassette tape player 182. The physical link between the WIA 186 and the actual user connection 188 occurs through cables connected by a user, or actual acoustic audio waves coupling to the microphone (not shown). In this scenario, the input 188 is from an external auxiliary audio device, such as a CD player. Bluetooth radio signals between the WIA Bluetooth radio 220 and the NIC Bluetooth radio 206 for the physical layer between these devices. The physical link between the NIC 184 and the cassette tape player 182 occurs via magnetic flux coupling between the NIC head interface means 200 and the cassette tape player head 192. Above the physical layer, is the hardware/software interface layers, which include the software to hardware drivers.

The NIC 184 head interface means 200 is coupled to the NIC Bluetooth host controller 196 by a Bluetooth head interface driver 198. On the Bluetooth radio link side of the NIC 184, the Bluetooth link controller 204 and Bluetooth link manager 202 couple to the Bluetooth host controller 196. The Bluetooth radio 206 in the NIC 184 communicates with the Bluetooth radio 220 in the WIA 186. At the link level, the corresponding link mangers 202 and 216 control the Bluetooth session. The WIA Bluetooth link controller 218 provides the physical to software interface on the WIA 186 side. The Bluetooth host controller 210 in the WIA 208 couples to the Bluetooth user interface driver 212, which physically couples to the user interface connectors 214. Thus, the audio content is transferred from a physical connection in the WIA, across the Bluetooth network forming an end-to-end link to the cassette tape player.

Figures 8, 9:
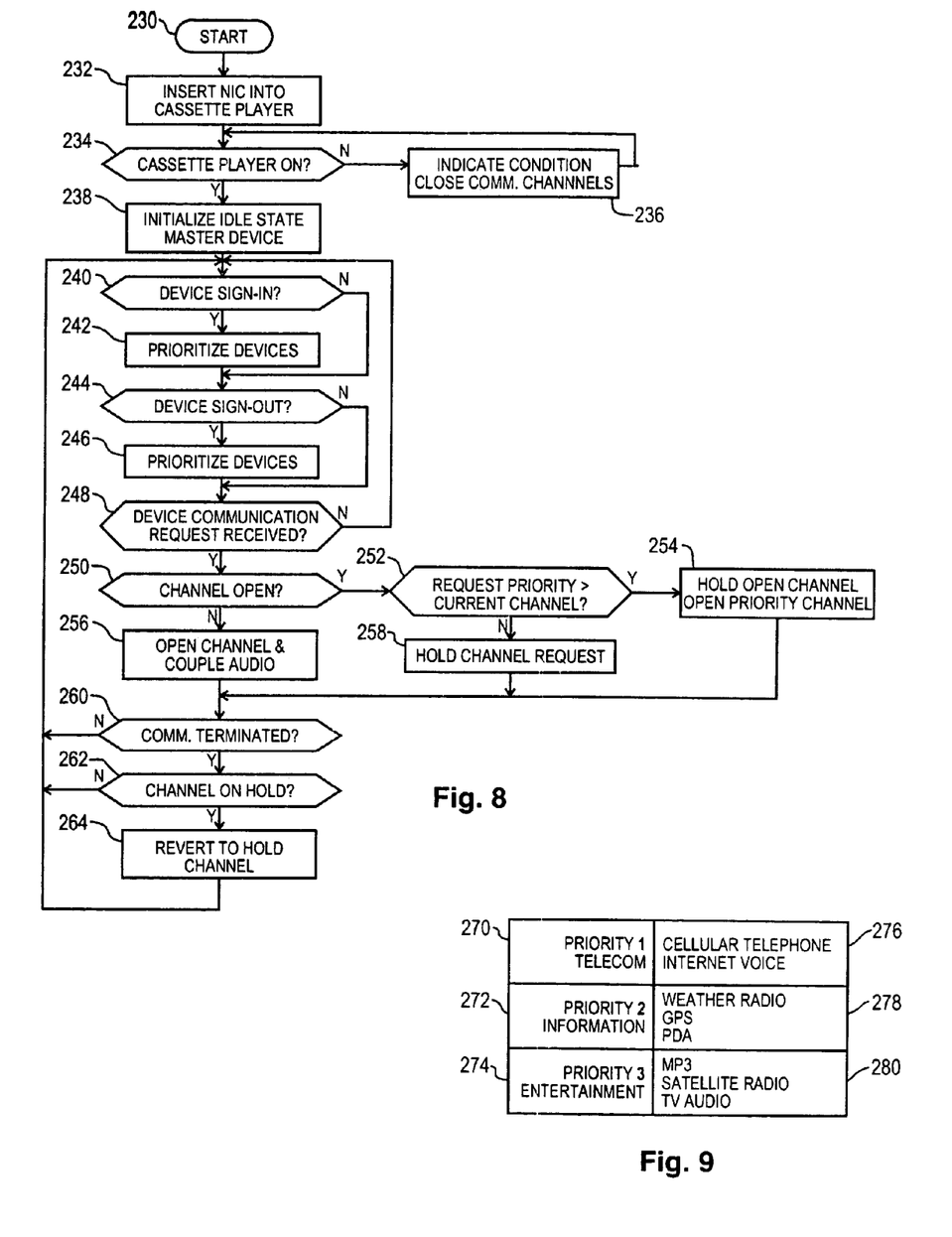
FIG. 8 is a process flow diagram according to an illustrative embodiment of the present invention.
FIG. 9 is a priority table according to an illustrative embodiment of the present invention.

Reference is directed to FIG. 8, which is a process flow diagram according to an illustrative embodiment of the present invention. The process illustrated in FIG. 8 involves the operation of the NIC as inserted into a cassette tape player, with subsequent audio content channel requests and prioritization. The process begins at step 230 and proceeds to step 232 when the user inserts the NIC into their cassette tape player. This action turns on the power of the NIC, which tests to determine if the cassette player is on. This test can be accomplished in a number of ways, in the illustrative embodiment, the rotating capstan shaft is an indicator that the cassette is both on and in the playback mode of operation. Obviously, the playback mode is required in order to cause audio content to be reproduced through the cassette player. If the cassette player is not ready in step 234, flow proceeds to step 236 where the user is presented with an indication that the cassette player is not ready. The indication may be visual or audible, such as a light or beep sound, for example. If a communications channel is already open in the network, it is closed at step 236, since reproduction by the cassette player is no longer possible.

Continuing in FIG. 8, if the cassette player is on at step 234, flow proceeds to step 238. At step 238, the NIC initializes an idle state of operation, and establishes itself as a master device in the Bluetooth network. The idle state enables other device to establish communications with the NIC from time to time. At step 240, the main operating loop of the process is entered, and a test is made to determine if any other network devices have signed in. If another device has signed in, then the new device priority is checked and recorded at step 242. Device priorities are needed to establish resource allocation corresponding to the different priorities. Priorities will be more fully discussed below. On the other hand, at step 240, if no new device has singed in, then flow proceeds to step 244, to test whether any device has signed out, or simply stopped communicating through the network. If a device has signed out at step 244, then flow proceeds to step 246, where the remaining devices still signed into the network are re-prioritized. On the other hand, at step 244, if no device has signed out, flow proceeds to step 248.

Step 248 in FIG. 8 is a test to determine if any of the devices currently signed into the network have made a communications request. Such a request occurs when one of the devices is attempting to transfer audio content to another device. Typical examples include an incoming telephone call, tuning in a DBS satellite station, playing a song through the MP3 player, and so forth. If no device has made a communications request at step 248, flow returns in loop fashion to step 240, where the aforementioned sing-in and sign-out tests are repeated. On the other hand, at step 248, if a device has made a communications request, then flow continues to step 250 to determine if there is an existing channel open. Since the cassette tape player can only reproduce one channel at a time, it is important to determine if the requesting device has a higher or lower priority prior to assigning a new terminal device for audio content reproduction. If there are two contending requests, the present invention uses a priority scheme to arbitrate the contention. At step 250, if there is a channel already open, then the requesting channel's priority is checked against the current channel. If the new request has an equal or lower priority, the current channel retains the resource and the new channel request is held at step 258, and flow proceeds to step 260. On the other hand, if the new channel request has a higher priority at step 252, then the current channel is held at step 254 and the new request is coupled as well. Flow proceeds to step 260. To complete the flow from step 250, if no channel is open, then the new request is assigned a new channel and flow continues to step 260.

The priority test and call hold features of the present invention allow the user to enjoy lower priority services yet not miss higher priority services. The technique used is to hold a lower priority resource until the higher priority communications is completed, and then revert to the lower priority communications. The reversion actions begins at step 260 in FIG. 8. If the current communications channel has not been terminated, then flow returns to step 240, to repeat the aforementioned sequences, including prioritization of any new requests. On the other hand, at step 260, if a communications channel has been terminated, then a test is made at step 262 to determine if there is a communications request on hold. If not, flow returns to step 240. If there is a communications request on hold at step 262, then the channel reverts to the held request at step 264 before the process returns to the main loop.

Reference is directed to FIG. 9, which is a priority table according to an illustrative embodiment of the present invention. In the illustrative embodiment, three priority levels are employed. Of course, any number of priorities could be defined. The lowest priority is Priority 3, box 274, which consists of entertainment only sources of audio content. MP3, Satellite Radio, and TV Audio content 280 are set to Priority 3. The mid-level priority is Priority 2, box 272, which consists of Weather Radio, GPS information, and PDA content 278. The highest priority level is Priority 1, box 270, which consists of cellular telephone calls, and Internet Voice communications 276. The priority levels may also be user defined. As defined in FIG. 9, cellular telephone communications request would preempt MP3 playback, as so forth.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus for coupling signals between a wireless network and a tape head in a cassette tape player, and adapted to provide an ear and mouth signal interface for a wireless network enabled cellular telephone, the apparatus comprising:
an enclosure, conformed to the cassette tape form factor, containing;
a transceiver, operable to convert base band signals for radio frequency communications within the wireless network;
a network controller, coupled to communicate the base band signals with said transceiver, and operable to convert digital audio signals to and from the base band signals;
an audio processor, operable to convert the digital audio signals to analog audio signals;
a microphone input coupled to said audio processor, for inputting microphone signals thereto, and wherein said audio processor is operable to convert the microphone signals to digital microphone signals;
a coupling means, operable to convert the analog audio signals to magnetic audio signals, and aligned to couple the magnetic audio signals to the tape head, and wherein
said network controller is operable to convert the digital microphone signals to base band wireless network signals for coupling to, and transmission from, said transceiver and into the wireless network, thereby enable ear and mouth signal communications with the cellular telephone through utilization of said microphone input and the cassette tape player audio playback capabilities;
means for establishing a first streaming audio connection, having a first priority assigned thereto, from the external wireless network device to the tape head;
means for receiving a request for a second streaming audio connection, having a second priority assigned thereto, to the tape head, and
means for preempting said first streaming audio connection if said second priority is higher than said first priority.

2. The apparatus of claim 1, further comprising:
a power supply disposed within said enclosure and coupled to provide electric power to said transceiver, said network controller, and said audio processor.

3. The apparatus of claim 2 wherein said power supply further comprises:
a switch positioned for actuation when said enclosure is inserted into the tape player, and wherein
actuation of said switch couples the electrical power.

4. The apparatus of 2 wherein the cassette player includes a rotating capstan and a pinch roller, and wherein
said power supply further comprises a generator for producing the electric power, said generator rotatably coupled to the capstan shaft for deriving mechanical power therefrom.

5. The apparatus of claim 4 wherein said generator is rotatably coupled to the capstan by a tape engaged between the capstan and the pinch roller.

6. The apparatus of claim 4 wherein said generator is rotatably coupled to the capstan by a means for multiplying rotational speed.

7. The apparatus of claim 1, further comprising a microphone coupled to said microphone input.

8. The apparatus of claim 1, further comprising an auxiliary audio input coupled to said audio processor for receiving auxiliary audio signals, and wherein
said audio processor is operable to couple the auxiliary audio signals to said coupling means.

9. The apparatus of claim 1, further comprising an audio output coupled to receive the analog audio signals from said audio processor, thereby enabling the connection thereof to an external device.

10. An apparatus for coupling signals between a wireless network and a tape head in a cassette tape player, and adapted to provide an ear and mouth signal interface for a wireless network enabled cellular telephone, the apparatus comprising:
an enclosure, conformed to the cassette tape form factor, containing;

a transceiver, operable to convert base band signals for radio frequency communications within the wireless network;

a network controller, coupled to communicate the base band signals with said transceiver, and operable to convert digital audio signals to and from the base band signals;

an audio processor, operable to convert the digital audio signals to analog audio signals;

a microphone input coupled to said audio processor, for inputting microphone signals thereto, and wherein said audio processor is operable to convert the microphone signals to digital microphone signals;

a coupling means, operable to convert the analog audio signals to magnetic audio signals, and aligned to couple the magnetic audio signals to the tape head, and wherein said network controller is operable to convert the digital microphone signals to base band wireless network signals for coupling to, and transmission from, said transceiver and into the wireless network, thereby enable ear and mouth signal communications with the cellular telephone through utilization of said microphone input and the cassette tape player audio playback capabilities;

an interface module for enabling wireless user interface connections with the apparatus, said interface module comprising:

a module housing, which is external to and separate from said enclosure, the module housing containing:

a module transceiver, operable to convert base band signals for radio frequency communications within the wireless network;

a module network controller, coupled to communicate the base band signals with said module transceiver, and operable to convert digital audio signals to and from the base band signals;

a module audio processor, operable to convert the digital audio signals to analog audio signals, and a module interface for coupling analog audio signals with said module audio processor, and wherein said module network controller is operable to establish audio connections with said network controller through said module transceiver and said transceiver according to a wireless network protocol.

11. The apparatus of claim 10 wherein said interface module comprises a module microphone input for receiving analog microphone signals.

12. The apparatus of claim 11, further comprising a module microphone coupled to said module microphone input.

13. The apparatus of claim 10 wherein said interface module comprises a module audio output coupled to receive the analog audio signals from said audio processor, thereby enabling the connection thereof to an external device.

14. The apparatus of claim 10 further comprising:

a module power supply coupled at provide electric power to said module transceiver, said module network controller, and said module audio processor.

15. The apparatus of claim 14, further comprising:

a photo-voltaic cell coupled to said module power supply.

16. A method of reproducing audio signals between a wireless network and a tape head in a cassette tape player, including the provision of ear and mouth telephone signals for a wireless network enabled cellular telephone, comprising the steps of:

converting base band signals for radio frequency communications within the wireless network;

converting digital audio signals to and from said base band signals;

converting said digital audio signals to analog audio signals;

converting said analog audio signals to magnetic audio signals;

coupling said magnetic audio signals to the tape head by inserting an enclosure conformed to the cassette tape form factor into the cassette tape player, thereby enabling the reproduction of audio signals by the cassette tape player;

inputting analog microphone signals;

converting said analog microphone signals to digital microphone signals;

converting said digital microphone signals to base band wireless network signals for coupling to, and transmission within the wireless network;

establishing a first streaming audio connection, having a first priority assigned thereto, from an external wireless network device to the tape head;

receiving a request for a second streaming audio connection, having a second priority assigned thereto, to the tape head, and preempting said first streaming audio connection if said second priority is higher than said first priority.

17. The method of claim 16 wherein said converting steps are accomplished by semiconductor devices that are powered by a power supply disposed within the enclosure.

18. The method of claim 17, further comprising the step of:

actuating a switch upon inserting the enclosure into the cassette tape player, thereby coupling the power supply to the semiconductor devices.

19. The method of claim 17, wherein the cassette player includes a rotating capstan and a pinch roller, the method further comprising the steps of:

coupling mechanical power from the capstan to the generator, and generating electric power with the mechanical power.

20. The method of claim 19, further comprising the step of:

rotatably coupling to the capstan with a tape engaged between the capstan and the pinch roller.

21. The method of claim 19, further comprising the step of:

multiplying rotational speed of the capstan during said coupling mechanical power step.

22. The method of claim 16, further comprising the step of:

coupling auxiliary audio signals from an auxiliary audio input prior to said converting said analog audio signals to magnetic audio signals step.

23. The method of claim 16, further comprising the step of:

establishing a first streaming audio connection from an external wireless network device to the tape head, thereby enabling acoustic audio reproduction through the cassette tape player.

24. The method of claim 23, further comprising the steps of:
　establishing a second streaming audio connection from a microphone to the external wireless network device.

25. A method of reproducing audio signals between a wireless network and a tape head in a cassette tape player, comprising the steps of:
　converting base band signals for radio frequency communications within the wireless network;
　converting digital audio signals to and from said base band signals;
　converting said digital audio signals to analog audio signals;
　converting said analog audio signals to magnetic audio signals;
　coupling said magnetic audio signals to the tape head by inserting an enclosure conformed to the cassette tape form factor into the cassette tape player, thereby enabling the reproduction of audio signals by the cassette tape player;
　establishing a first streaming audio connection, having a first priority assigned thereto, from an external wireless network device to the tape head;
　receiving a request for a second streaming audio connection, having a second priority assigned thereto, to the tape head, and
　preempting said first streaming audio connection if said second priority is higher than said first priority.

26. The method of claim 25, further comprising the steps of:
　establishing a second streaming audio connection according to said request, and
　reverting to said first streaming audio connection when said second streaming audio connection is terminated.

* * * * *